3,489,763
Patented Jan. 13, 1970

3,489,763
DEHYDROXYLATION OF PHENOLS
John W. Gates and Walter J. Musliner, Rochester, N.Y., assignors to Eastman Kodak Company, Rochester, N.Y., a corporation of New Jersey
No Drawing. Filed Aug. 22, 1966, Ser. No. 573,831
Int. Cl. C07d 85/06, 55/56
U.S. Cl. 260—307                                8 Claims

ABSTRACT OF THE DISCLOSURE

Aromatic hydroxy compounds, such as phenol and naphthol compounds, are dehydroxylated by a two-step process which involves (1) the treatment of the hydroxy compound with a 5-halogen substituted tetrazole or a 2-halogen substituted benzoxazole compound to convert a hydroxy group to a heterocyclic ether group and (2) the hydrogenolysis of the heterocyclic ether compound over a catalyst of palladium on carbon or a platinum oxide catalyst to replace the heterocyclic ether group with a hydrogen atom. The compounds containing a heterocyclic ether grouping are believed to be new.

This invention relates to a novel and improved two-step process for the replacement of phenolic hydroxyl groups by hydrogen, i.e., dehydroxylation of phenols, and to a new class of stable crystalline heterocyclic ethers derived as intermediates in the process.

A number of methods have previously been proposed for the replacement of phenolic hydroxyl groups by hydrogen. However, none of these methods have proven entirely satisfactory for use as a general method for this imported transformation [W. H. Pirkle et al., J. Org. Chem., 29, 3124 (1964), and references cited therein]. For example, the classical zinc dust distillation method has been recognized as not generally useful except for the exhaustive degradation of hydroxylated substances to hydrocarbons. A more recently reported method involved the removal of phenolic hydroxyl of various 3-methoxy-4-hydroxymorphine derivatives [Y. K. Sawa et al., Tetrahedron, 15, 144, 154 (1961); Y. K. Sawa et al., ibid, 21, 1121 (1965); Y. K. Sawa et al., ibid, 21, 1129 (1965); and Y. K. Sawa, ibid, 21, 1133 (1965)]. This method involved a sodium and liquid ammonia cleavage of phenol ethers, while a similar, more generally applicable procedure (Pirkle et al. above cited) required the proparation of a 2,4-dinitrophenyl ether of the phenol, catalytic reduction to the unstable diaminophenyl ether, followed by a sodium and liquid ammonia cleavage of the substituted ether to effect the desired replacement of phenolic hydroxyl group by hydrogen. Both of these procedures are based on the cleavage of diphenyl ethers by sodium in liquid ammonia, a reaction studied earlier by Sawa and co-workers [P. A. Sartoretto and F. J. Sowa, J. Am. Chem. Soc., 59, 603 (1937); A. L. Kranzfelder, J. J. Verbanc and F. J. Sowa, ibid, 59, 1488 (1937); and F. C. Weber and F. J. Sowa, ibid, 60, 94 (1938)]. Accordingly, the useful scope of these reactions is limited to phenols with ortho methoxy or aryl substituents. Also, it has been noted that none of the previously reported procedures regularly give high yields of product.

We have now discovered a novel and improved two-step method for facile replacement of phenolic hydroxyl group by hydrogen which has generally wide application, gives excellent yields of product, and succeeds where other methods have failed. In contrast to the prior art, this new method works equally well with various ortho, meta and para substituents over the phenol nucleus such as alkyl, alkoxy, phenoxy, nitro, amino, carboxyl, alkoxycarbonyl, acyloxy, halogen, aryl, etc. It provides a means for converting various aromatic phenols to the corresponding dehydroxylated compounds, while at the same time providing valuable ketone byproducts, for example, such as 1-phenyl-5-tetrazolone and 2-benzoxazolone. Also, the method provides a new class of ether intermediates that are stable crystalline solids which can be stored, if desired, or used directly for the hydrogenolysis step of the process. In addition, the method of the invention has direct and useful applications for removal of phenolic hydroxyl groups in the steroids, alkaloid and other related natural product fields either in synthetic or structure determination.

Accordingly, it is an object of the invention to provide a novel and improved two-step process for the replacement of phenolic hydroxyl groups by hydrogen as set forth hereinafter. Another object is to provide a novel and improved process wherein the phenol to be dehydroxylated may also contain one or more ortho, meta or para substituents. Another object is to provide a novel and improved process for transforming certain halogenated nitrogen heterocyclic compounds to the corresponding ketones. Another object is to provide a new class of ethers derived in accordance with step (1) of the process. Other objects will become apparent from this disclosure and the appended claims.

In accordance with the invention, we carry out our novel process by (1) first preparing and isolating the ether of the phenolic hydroxy compound with a suitable halogenated heterocyclic compound, and (2) ten subjecting this ether product to catalytic hydrogenolysis, in liquid phase, preferably over metallic palladium on a suitable support material such as charcoal, to cleave the heterocyclic ether group. Suitable halogenated heterocyclic compounds for carrying out te above process include 5-halogen substituted tetrazoles and 2-halogen substituted benzoxazoles, and more particularly 1-phenyl-5-chlorotetrazole and 2-chlorobenzoxazole. The ethers are readily prepared therefrom in high yields as stable crystalline compounds, which undergo hydrogenolysis smoothly at temperatures of about from 20–60° C., and preferably at from 30–40° C., in benzene or ethanol, and afford good yields of the easily separable heterocyclic ketone and dehydroxylated phenol. On the other hand 2-halogen substituted benzothiazoles proved unsatisfactory in the above process primarily because of inability to cleave the heterocyclic ether in the hydrogenolysis step.

The reaction sequence of the process of the invention is illustrated with various starting phenols and halogenated tetrazoles as follows:

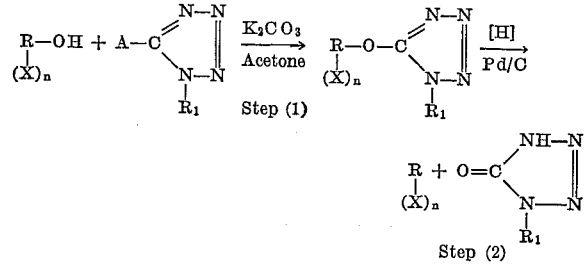

Step (1)
Step (2)

wherein $n$ represents a positive integer of from 1 to 3, A represents a halogen atom such as bromine or chlorine, R represents an aryl nucleus such as a phenyl or naphthyl nucleus, $R_1$ represents an aryl group such as phenyl, tolyl, xylyl, naphthyl, etc., X represents a hydrogen atom, an alkyl group of from 1 to 18 carbon atoms, e.g., methyl, ethyl, isopropyl, butyl, hexyl, nonyl, decyl, dodecyl, octadecyl, etc., an alkoxy group of from 1 to 4 carbon atoms, e.g., methoxy, ethoxy, propoxy, butoxy, etc., a phenoxy group, a nitro group, an amino group, a carboxyl group, an alkoxycarbonyl group of from 2 to 5 carbon atoms, e.g., methoxycarbonyl, ethoxycarbonyl, butoxycarbonyl, etc., an acyloxy group, e.g., acetoxy, propionyloxy, butyryloxy, benzoyloxy, etc., a halogen atom, e.g., chlorine or bromine, or an aryl group, e.g., phenyl, tolyl, xylyl, naphthyl, etc. Approximately equimolar proportions of the phenol and the halogenated tetrazole are employed in step (1) of the above process. The alkali metal carbonate, e.g., sodium or potassium carbonate, is preferably used in an amount equivalent to about 1 mole or more for each mole of the phenol and each mole of the halogenated tetrazole. Advantageously, the reaction is carried out in an inert solvent such as acetone, at elevated temperatures preferably at the refluxing temperature of the reaction mixture. After completion of the reaction, the ether product is separated and purified by conventional methods such as filtration and recrystallization. In the hydrogenolysis step (2) of the above process, the concentration of the catalyst can vary from about 5 to 20%, based on the weight of the starting ether, depending on the particular reaction conditions.

In place of the halogenated tetrazole reactant, there can be substituted in the above reaction an equivalent amount of a halogenated benzoxazole of the general formula:

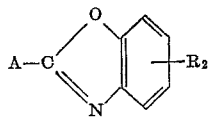

wherein A is as previously defined, and $R_2$ represents a hydrogen atom, an alkyl group of from 1 to 4 carbon atoms, e.g., methyl, ethyl, isopropyl, butyl, etc., or an aryl group, e.g., phenyl, tolyl, naphthyl, etc., to give a similar dehydroxylated product of the general formula:

wherein $n$, R and X are as previously defined, and an intermediate ether of the general formula:

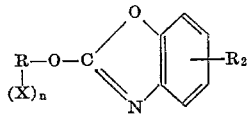

wherein $n$, R, $R_2$, and X are as previously defined. In this case, ketone produced was 2-benzoxazolone or substituted product thereof as indicated by $R_2$.

The palladium catalyst in the above reaction can also be replaced with a platinum oxide catalyst to give generally similar results. For example, anisole was obtained in 67% yield from phenyltetrazolyl ether of guaiacol under the same conditions. However, phenolic hydroxyl groups could not be removed with a Raney nickel catalyst.

In carrying out the process of the invention, we have found that the phenyltetrazolyl ethers are most advantageous for the hydrogenolysis step (2) and are the preferred intermediates. Not only do they afford the highest melting, most readily formed ethers, but they and the 1-phenyl-5-tetrazolone formed have the least poisoning effect on the preferred palladium catalyst.

The following examples further illustrate the invention.

Example 1.—2-[1-phenyl-5-tetrazolyloxy]-biphenyl

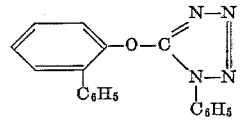

A suspension of 17 g. (0.1 mol.) of o-phenylphenol, 18 g. (0.1 mol.) of 1-phenyl-5-chlorotetrazole and 27.6 g. (0.2 mol.) of anhydrous potassium carbonate in 250 ml. of dry acetone was refluxed 18 hours, cooled, diluted with water and the product collected by filtration. Purification was effected by recrystallization from ethyl acetate to yield 98% of the ether product, M.P. 112–113° C.

Hydrogenolysis

A solution of 10 parts of 2-[1-phenyl-5-tetrazolyloxy]-biphenyl in 200 parts of benzene was hydrogenated in a Parr shaker at 40 lbs. and at 35° C. for 7.5 hours using palladium on charcoal catalyst (2 parts). The mixture was cooled to room temperature and filtered. The reaction vessel and catalyst were washed well with hot ethanol to dissolve the 1-phenyl-5-tetrazolone. The combined solutions were stripped to dryness and then treated with 100 parts of benzene and 100 parts of a 10 percent sodium hydroxide solution. The layers were separated and the aqueous solution acidified to afford 4.2 parts (82% yield) of 1-phenyl-5-tetrazolone. The benzene solution was dried and stripped to dryness to yield 4 parts of biphenyl.

Examples 2 to 14

The procedure of above Example 1 was repeated, in general, except that the o-phenylphenol and the 1-phenyl-5-tetrazole were replaced by reactants as indicated in Table 1. This table also lists the results obtained.

TABLE 1

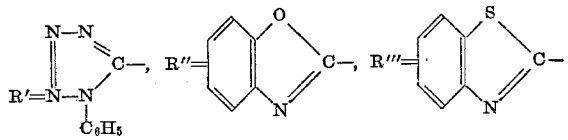

| Example No. | Parent phenol | Heterocyclic ether | Percent Yield, ether | M.P.,°C., ether | Time, hours | Hydrogenolysis products, percent yield [1] | |
|---|---|---|---|---|---|---|---|
| | | | | | | Aromatic product | Heterocyclic Ketone |
| 2 | Guaiacol | R′ | 94 | 111–112 | 15 | 86, Anisole [2] | 70 |
| 3 | Guaiacol | R‴ | 78 | 66–67 | 16 | 0, Anisole [2] | -- |
| 4 | m-Methoxyphenol | R′ | 95 | 87–88 | 16 | 85, Anisole [2] | 54 |
| 5 | p-Methoxyphenol | R′ | 97 | 81–82 | 6 | 83, Anisole [2] | 70 |
| 6 | p-Phenylphenol | R′ | 93 | 152–153 | 15 | 78, Biphenyl [3] | 89 |
| 7 | o-Phenylphenol | R″ | 86 | 66–67 | 15 | 82, Biphenyl | 85 |
| 8 | p-Phenylphenol | R″ | 98 | 116–117 | 16 | 75, Biphenyl | 92 |
| 9 | p-Phenylphenol | R‴ | 83 | 106–107 | 16 | 0 | -- |
| 10 | p-Aminophenol | R′ | 86 | 171–173 | 9 | 46, Aniline [2] | 73 |
| 11 | p-Carbethoxyphenol | R′ | 91 | 88–89 | 16 | 89, Ethylbenzoate [2] | 46 |
| 12 | Thymol | R′ | 93 | 77–78 | 15 | 72, p-Cymene [2] | -- |
| 13 | 2-Naphthol | R′ | 94 | 136–137 | 17 | 65, Naphthalene | 94 |
| 14 | 1-Naphthol | R′ | 88 | 108–109 | 7 | 50, Naphthalene | 82 |

[1] Hydrogenolysis run in benzene, isolated yields unless otherwise indicated.
[2] Filtered benzene solution analyzed by VPC using toluene as an internal standard.
[3] Ethanol solvent.
[4] Isolated as the hydrochloride.

Referring to above Example 1 and Table 1, it will be noted that the process of the invention is quite general and produces the desired intermediate ethers and dehydroxylated materials in good yields. This is a marked improvement over the method of sodium and liquid ammonia cleavage of the reduced dinitrophenyl ethers of the isomeric methoxyphenols (above cited W. H. Pirkle et al. reference) which gave anisole from o-, m-, and p-methoxyphenol in only 60%, 31%, and 0% yields, respectively. The method of the invention, for example, for the 1-phenyl-5-tetrazolyl ethers gave anisole in over 80% yields in all three instances (Examples 1, 4 and 5). It will be further noted from above Table 1 that Examples 3 and 9 prepared with 2-chlorobenzothiazole did not yield any of the expected dehydroxylated products.

Although the invention has been described in considerable detail with particular reference to certain preferred embodiments thereof, it will be understood that variations and modifications can be effected within the spirit and scope of the invention as described hereinabove.

We claim:

1. A process for dehydroxylating phenols which comprises the steps of (1) reacting in approximately equimolar proportions (a) a phenol of the general formula:

$$R-OH$$
$$(X)_n$$

wherein $n$ represents a positive integer of from 1 to 3, R represents an aryl nucleus selected from the group consisting of a phenyl nucleus and a naphthyl nucleus, and X represents a member selected from the group consisting of a hydrogen atom, a lower alkyl group, a lower alkoxy group, a phenyl group, a phenoxy group, an amino group, a carboxy group and an alkoxycarbonyl group of from 2 to 5 carbon atoms with (b) a halogenated heterocyclic compound selected from those represented by the general formulas:

[Structure: A-C with N-N, N-N ring, R₁]

and

[Structure: A-C with O, N benzoxazole ring]

wherein A represents a halogen atom and R₁ represents a phenyl nucleus to form a heterocyclic intermediate product selected from those represented by the general formulas:

[Structure: R-O-C with (X)ₙ, N-N, N-N ring, R₁]

[Structure: R-O-C with (X)ₙ, O, N benzoxazole ring]

wherein $n$, R, R₁, and X are as above defined, and (2) subjecting said heterocyclic ether to catalytic hydrogenolysis at 20–60° C., in liquid phase, over a catalyst, selected from the group consisting of palladium and platinum oxide.

2. A process in accordance with claim 1 wherein said halogenated heterocyclic compound has the general formual:

[Structure: A-C with N-N, N-N ring, R₁]

wherein A represents a halogen atom and R₁ represents a phenyl nucleus.

3. A process for dehydroxylating phenols which comprises the steps of (1) reacting (a) a phenol of the general formula:

$$R-OH$$
$$(X)_n$$

wherein $n$ represents a positive integer of from 1 to 3, R represents an aryl nucleus selected from the group consisting of a phenyl nucleus and a naphthyl nucleus, and X represents a member selected from the group consisting of a hydrogen atom, a lower alkyl group, a lower alkoxy group, a phenyl group, a phenoxy group, an amino group, a carboxy group and an alkoxycarbonyl group of from 2 to 5 carbon atoms with (b) 1-phenyl-5-chlorotetrazole to form a heterocyclic ether intermediate product of the general formula:

[Structure: R-O-C with (X)ₙ, N-N, N-N ring, C₆H₅]

wherein $n$, R and X are as above defined and (2) subjecting said heterocyclic ether to catalytic hydrogenolysis at 20–60° C., in liquid phase over palladium catalyst.

4. The process of claim 3 wherein said phenol is o-phenylphenol.

5. The process of claim 3 wherein said phenol is p-methoxyphenol.

6. The process of claim 3 wherein said phenol is p-ethoxycarbonylphenol.

7. The process of claim 3 wherein said phenol is 2-naphthol.

8. A process for dehydroxylating o-phenylphenol which comprises the steps of (1) reacting said phenol with 2-chlorobenzoxazole to form 2-[2-benzoxazolyloxy]-diphenyl, and (2) subjecting said phenyl compound to catalytic hydrogenolysis at 20–60° C., in liquid phase, over a catalyst of palladium on carbon.

References Cited

Sartoretto et al.; J. Am. Chem. Soc. 59, 603 (1937).

ALEX MAZEL, Primary Examiner

R. V. RUSH, Assistant Examiner

U.S. Cl. X.R.

260—308, 473, 476, 479, 520, 521, 575, 613, 668

UNITED STATES PATENT OFFICE
CERTIFICATE OF CORRECTION

Patent No. 3,489,763            Dated 13 January 1970

Inventor(s) John W. Gates and Walter J. Musliner            PAGE -1

It is certified that error appears in the above-identified patent and that said Letters Patent are hereby corrected as shown below:

Column 3, Table I

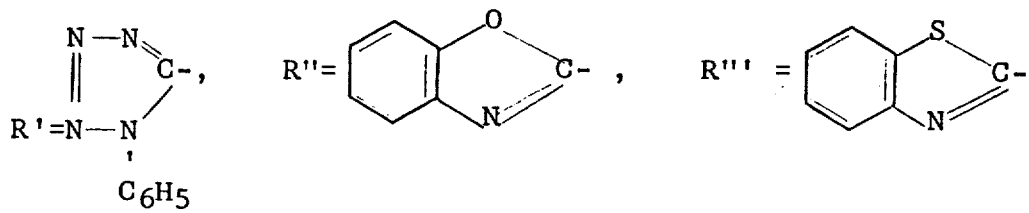

should read --

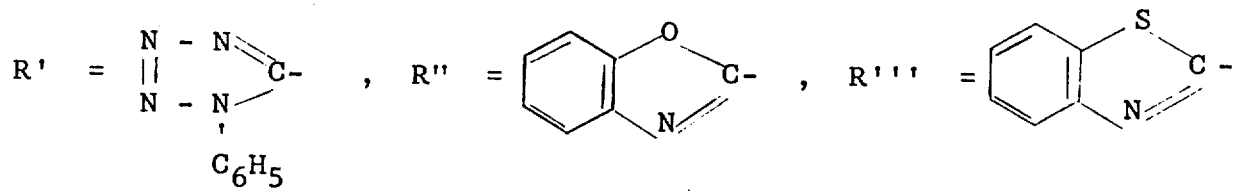

PO-1050
(5/69)

UNITED STATES PATENT OFFICE
CERTIFICATE OF CORRECTION

Patent No. 3489763    Dated 1/13/70

Inventor(s) John W. Gates and Walter J. Musliner    PAGE - 2

It is certified that error appears in the above-identified patent and that said Letters Patent are hereby corrected as shown below:

Column 5, Line 39

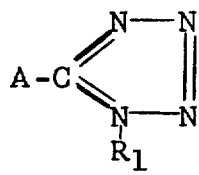

should read --

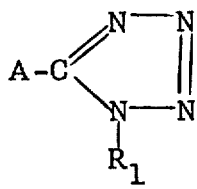

PO-1050
(5/69)

UNITED STATES PATENT OFFICE
CERTIFICATE OF CORRECTION

Patent No. 3,489,763          Dated 13 January 1970

Inventor(s) John W. Gates and Walter J. Musliner    PAGE - 3

It is certified that error appears in the above-identified patent and that said Letters Patent are hereby corrected as shown below:

Column 6, Line 33

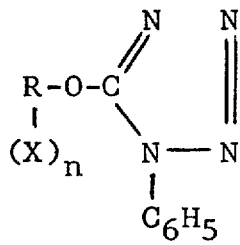

should read --

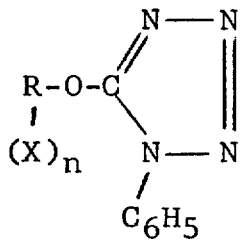

PO-1050
(5/69)

UNITED STATES PATENT OFFICE
CERTIFICATE OF CORRECTION

Patent No. 3,489,763          Dated   13 January 1970

Inventor(s)  John W. Gates and Walter J. Musliner   PAGE-4

It is certified that error appears in the above-identified patent and that said Letters Patent are hereby corrected as shown below:

Column 6, Line 53

"said phenyl compound"

should read --

--- said diphenyl compound ---

Signed and sealed this 20th day of April 1971.

(SEAL)
Attest:

EDWARD M. FLETCHER, JR.
Attesting Officer

WILLIAM E. SCHUYLER, JR
Commissioner of Patents